US007103568B1

(12) United States Patent
Fusz et al.

(10) Patent No.: US 7,103,568 B1
(45) Date of Patent: Sep. 5, 2006

(54) ONLINE PRODUCT EXCHANGE SYSTEM

(76) Inventors: Eugene August Fusz, 925 N. Lindbergh, St. Louis, MO (US) 63141; Christopher Ames Kline, 12138 Vivacite Walk, St. Louis, MO (US) 63146

( * ) Notice: Subject to any disclaimer, the term of this patent is extended or adjusted under 35 U.S.C. 154(b) by 0 days.

(21) Appl. No.: 10/785,111

(22) Filed: Feb. 23, 2004

Related U.S. Application Data

(63) Continuation of application No. 08/550,455, filed on Oct. 30, 1995, which is a continuation-in-part of application No. 08/512,365, filed on Aug. 8, 1995, now abandoned.

(51) Int. Cl.
*G06Q 30/00* (2006.01)
(52) U.S. Cl. .......................................... 705/26; 705/14
(58) Field of Classification Search ............. 705/10–42
See application file for complete search history.

(56) References Cited

U.S. PATENT DOCUMENTS

| | | | |
|---|---|---|---|
| 3,573,747 A | 4/1971 | Adams et al | |
| 3,581,072 A | 5/1971 | Nymeyer | |
| 4,247,759 A | 1/1981 | Nora, et al. | |
| 4,412,287 A | 10/1983 | Braddock, III | |
| 4,449,186 A | 5/1984 | Kelly et al. | |
| 4,553,222 A | 11/1985 | Kurland et al. | |
| 4,677,552 A | 6/1987 | Sibley, Jr. | |
| 4,751,728 A | 6/1988 | Treat | |
| 4,763,356 A | 8/1988 | Day, Jr. et al. | |
| 4,789,928 A | 12/1988 | Fujisaki | |
| 4,799,156 A | 1/1989 | Shavit et al. | |
| 4,862,357 A | 8/1989 | Ahlstrom et al. ........... 364/407 |
| 4,868,736 A | 9/1989 | Walker | |
| 4,903,201 A | 2/1990 | Wagner | |
| 4,931,932 A | 6/1990 | Dalnekoff et al. | |
| 4,972,318 A | 11/1990 | Brown et al. | |
| 4,992,940 A * | 2/1991 | Dworkin ....................... 705/26 |
| 5,021,953 A | 6/1991 | Webber et al. | |
| 5,032,989 A | 7/1991 | Tornetta ..................... 340/731 |
| 5,077,665 A | 12/1991 | Silverman et al. | |
| 5,136,501 A | 8/1992 | Silverman et al. | |
| 5,168,446 A | 12/1992 | Wiseman | |
| 5,191,523 A | 3/1993 | Whitesage | |
| 5,191,613 A | 3/1993 | Graziano et al. | |
| 5,224,034 A | 6/1993 | Katz et al. | |
| 5,237,499 A | 8/1993 | Garback ..................... 364/407 |
| 5,243,515 A | 9/1993 | Lee | |

(Continued)

FOREIGN PATENT DOCUMENTS

EP            10 54 336         * 11/2000

(Continued)

OTHER PUBLICATIONS

"News and Notes", Videodisc and Opatical Disk, Jul.-Aug. 1985.*

(Continued)

*Primary Examiner*—Frantzy Poinvil
(74) *Attorney, Agent, or Firm*—Louis J. Hoffman

(57) ABSTRACT

An exchange system for facilitating the purchase of new cars is described. The system is coupled, in one embodiment, to a communications link. Potential car purchasers and sellers may access the exchange system via the network, and submit offers and/or pricing requests to such system. In response to the requests, the system processor retrieves the stored data from the respective databases, and causes such data to be transmitted to the local site for display. The exchange systems also executes certain functions in response to commands and data transmitted from buyer sites, dealer sites and institution sites.

50 Claims, 12 Drawing Sheets

U.S. PATENT DOCUMENTS

| | | | |
|---|---|---|---|
| 5,253,165 A | 10/1993 | Leiseca et al. | |
| 5,262,941 A | 11/1993 | Saladin et al. | |
| 5,283,731 A | 2/1994 | Lalonde et al. | |
| 5,297,031 A | 3/1994 | Gutterman et al. | |
| 5,329,589 A | 7/1994 | Fraser et al. | |
| 5,331,546 A | 7/1994 | Webber et al. | |
| 5,339,239 A | 8/1994 | Manabe et al. | |
| 5,361,199 A | 11/1994 | Shoquist et al. | |
| 5,377,097 A | 12/1994 | Fuyama et al. | |
| 5,404,291 A | 4/1995 | Kerr et al. | |
| 5,420,914 A | 5/1995 | Blumhardt | |
| 5,426,281 A | 6/1995 | Abecassis | |
| 5,444,630 A | 8/1995 | Dlugos | |
| 5,467,269 A | 11/1995 | Flaten | |
| 5,493,490 A | 2/1996 | Johnson | |
| 5,500,793 A | 3/1996 | Deming, Jr. et al. | |
| 5,517,555 A | 5/1996 | Amadon et al. | |
| 5,519,769 A | 5/1996 | Weinberger et al. | |
| 5,553,131 A | 9/1996 | Minervino, Jr. et al. | |
| 5,557,517 A | 9/1996 | Daughterty, III | |
| 5,557,518 A | 9/1996 | Rosen | |
| 5,570,238 A | 10/1996 | Shoolery, et al. | |
| 5,592,375 A | 1/1997 | Salmon et al. | |
| 5,606,602 A | 2/1997 | Johnson et al. | |
| 5,611,052 A | 3/1997 | Dykstra et al. | |
| 5,615,269 A | 3/1997 | Micali | |
| 5,664,115 A | 9/1997 | Fraser | |
| 5,689,652 A | 11/1997 | Lupien et al. | 705/37 |
| 5,694,551 A | 12/1997 | Doyle et al. | |
| 5,696,965 A | 12/1997 | Dedrick | |
| 5,710,887 A | 1/1998 | Chelliah et al. | 395/226 |
| 5,715,402 A | 2/1998 | Popolo | |
| 5,717,989 A | 2/1998 | Tozzoli et al. | |
| 5,732,400 A | 3/1998 | Mandler et al. | |
| 5,745,882 A | 4/1998 | Bixler et al. | |
| 5,757,917 A | 5/1998 | Rose et al. | 380/25 |
| 5,758,328 A | 5/1998 | Giovannoli | |
| 5,774,883 A | 6/1998 | Andersen et al. | |
| 5,794,207 A | 8/1998 | Walker et al. | |
| 5,794,219 A | 8/1998 | Brown | |
| 5,797,127 A | 8/1998 | Walker et al. | |
| 5,799,285 A | 8/1998 | Klingman | |
| 5,809,478 A | 9/1998 | Greco et al. | |
| 5,818,914 A | 10/1998 | Fujisaki | 379/93.12 |
| 5,826,244 A | 10/1998 | Huberman | |
| 5,832,452 A | 11/1998 | Schneider et al. | |
| 5,832,454 A | 11/1998 | Jafri et al. | 705/6 |
| 5,835,896 A | 11/1998 | Fisher et al. | |
| 5,845,265 A | 12/1998 | Woolston | 705/37 |
| 5,878,141 A | 3/1999 | Daly et al. | 380/25 |
| 5,878,403 A | 3/1999 | DeFrancesco et al. | |
| 6,085,176 A | 7/2000 | Woolston | |
| 6,202,051 B1 | 3/2001 | Woolston | 705/27 |
| 6,266,651 B1 | 7/2001 | Woolston | 705/27 |

FOREIGN PATENT DOCUMENTS

| | | |
|---|---|---|
| WO | 96/34356 | 10/1996 |
| WO | 97/16797 | 5/1997 |
| WO | 97/46961 | 12/1997 |

OTHER PUBLICATIONS

Business Wire, Bid.com Announces www.dutchauction.com, Oct. 28, 1998, Dialog file 16, Accession No. 05914806.*

Mercexchange L.L.C. v. eBay, Inc., et al., Order and Opinion, Civil Action No. 2:01cv736, Oct. 21, 2002.

Various materials regarding "DealerNet"; 1994.

"An Electronic Bridge To Customers," *Informationweek*, Jan. 16, 1995, pp. 38-39.

"Net Returns," by John Wolcott, *Horizon Air Magazine*, Nov. 1994, pp. 18-19.

Special Advertising Section, *Inc.*, Jan. 1995.

"Dialog System Seminar I: The Basics." Dialog Information Systems, Inc., 1989, Appendix D.

"Times Mirror Affiliate Launches First PC Travel Planning System for Corporate Use", American Database Corporation, Aug. 18, 1987.

"Announcing Dialorder Version 2," Dialog Information Systems, Inc., Oct., 1986.

Fishkin, Ken, Foresight Exchange Tutorial: (http://www.ideosphere.com/fx/docs/tutorial.html) Feb. 19, 1999 at pp. 1-5.

Bid.com 1998 Third-Quarter Revenue Increases 12.5 Percent from Second Quarter, *Business Wire*, Oct. 29, 1998.

Final Report Virtual Hospital (http://www.telemed.medadmin.uiowa.edu/TRCDocs/Pubs/FinalReport/cVirtualH/virtualH/virtualh02.html), download date: Sep. 20, 1998.

"First Source Become a Member", More Reasons to Join First Source! (http://www.fsource.com/bene.html), download date: Sep. 20, 1998.

Jeffrey Davis, "Big Strom Rising", Business 2.0, Sep. , 1998 at p. 60.

Suite 101.com (http://www.suite101.com/doc.cfm.presskit/questions), 1998.

LANCORP Mortgage Services, http://www.lancorp-mortgage.com/retailpa.htm, 1998.

Inland Mortgage Corporation, http://inlandmortgage.com/index.htm, 1998.

The Mortgage Store, http://www.mortgagestore.com, 1998.

Web Marketing Today (http://www.wilsonweb.com/rfwilson/wmt2/issue36htm) dated Sep. 1, 1997, download date: Sep. 17,1998.

"Free Stuff Internet Site Delivers for Viewers and Advertisers Alike", Press Release of PromoNet Interactive, Inc. dated Nov. 10, 1997.

Moran, Susan, "Xerox Won't Duplicate Past Errors", *Business Week*, Sep. 29, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred bidder Harvest, Sep. 1997, p. 58.

Coleman, Zach, "Electronic Trading System Matches Buyers, Sellers", *Atlanta Business Chronicle*, vol. 20, No. 12, p. 37A, Aug. 22, 1997.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded from www.sdtech.com/mls/process on Aug. 7, 1997.

Trade-Direct: We Help You Trade With Confidence, selected pages downloaded from www.trade-direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.com.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, 4th ACM Conference on Computer and Communications Security, *ACM Press*, 117-124 (Apr. 1997).

Bryant, Adam, "Shaking Up Air Fares' Status Quo", *The New York Times*, Mar. 31, 1997.

Silverman, Robert, "GM Drives Web Ad Insertion Network", Inside Media, Feb. 26, 1997, vol. 9, No. 4, p. 1, ISSN:1046-5316.

"Flycase Introduces Unique 'Open Exchange' Match-Making Service", *Interactive Marketing News*, Feb. 21, 1997, vol. 4, No. 8.

"UK's" World Telecom Unveils New WorldSaver Tariffs, Newsbytes, Information Access Company (Feb. 13, 1997).

Golden Age Antiques and Collectibles Online Auction, http://www.goldage.com, 1997.

Resnick, Paul et al., "Roles For Electronic Brokers", http://ccs.mit.edu/CCSWP179.htm 1997.

Philatelists Online Information, http://www.506.bonsai.com/q/@131354lhyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Negroponte, Nicholas, "Pay Whom Per What When, Part 2", *NEGROPONTE*, Issue 5.03, 1997.

"TransQuest and Web Ventures Deliver Internet Booking for Delta Air Lines", *PR Newswire*, Dec. 10, 1996, Financial News Section.

"Affinicast Enables Web Sites That Listen and Adapt to Customer Affinities", *PR Newswire*, Dec. 3, 1996.

"Web Ventures Presents BookIt!" press release printed from http://www/webventures.com/bookit/ (Web Ventures World Wide Web site) printed on Dec. 2, 1996.

"World's First Real-Time Travel Auction Service to Be Available Via World Wide Web: ETA To Open Bidding to Consumers," Business Wire, DIALOG Trade & Industry Database (Nov. 4, 1996).

Gessel, Chris, "Trade Smarter: The Limit of Orders", *Inventor's Business Daily*, Oct. 14 ,1996, p. A1.

CREST: Cruise/Ferry Revenue Management System, selected pages downloaded from www.rtscorp.com on Aug. 5,1996.

Nishimoto, Lisa, "Travel Services Are First Online Commerce Offerings to Fly," Infoworld, Jul. 29, 1996, downloaded from http://www.infoworld.com.

About Rate Hunter, downloaded from http://207.49.64.77/rhprodrh.htm on Jul. 14, 1996.

Cathay Pacific Online Ticket Bidding, *World Internet News Digest* (May 8, 1996).

Sothbey's General Information, downloaded from www.sothebys.com (1996).

CyberBid, Net Fun Ltd. (1996).

Nimmer, Raymond, T., "Electronic Contracting; Legal Issues", 14 *J. Marshall J. Computer & Info L.* 211, Winter, 1996.

American Law Institute, Draft-Uniform Commercial Code Revised Article 2 (Sales), parts 2,3 and 7, pp. 1-15, Jan. 4, 1996.

"Ticketing Revolution Could Triple Airline Profits, Analysts Says", *Aviation Daily*, vol. 325; No. 11, p. 87, 1996.

"Auctioning Unsold Airline Tickets", adapted extract from Insight (USA), *The Global Ideas Bank*, 1996.

Rockoff, Todd E., et al., "Design of an Internet-based system for remote Dutch Auctions," Internet Research: Electronic Networking Applications and Policy, vol. 5, No. 4, pp.10-16, 1995.

Franklin, Matthew K. et al., The Design and Implementation of a Secure Auction Service, Proceedings: 1995 Symposium on Security and Privacy, pp. 2-14, 1995.

Tenebaum, Jay M., et al. "CommerceNet: Spontaneous Electronic Commerce on the Internet," 1995 IEEE Spring Conference, pp. 38-43.

Sirbu, Marvin and Tygar, J.D., "NetBill: An Internet Commerce System Optimized for Network Delivered Services," IEEE 1995 Spring Conference, pp. 20-25.

Bunker, Ted, "How Auction Technology Sped and Enhanced Sale of Radio Licenses," Investor's Business Daily, Executive Update, Regulation, p. A3, Feb. 24, 1995.

"AUCNET: The Story Continues", *Harvard Business School*, Jan. 17, 1995.

Anand, R., and Rao, M. Padmaja, "The Electronic Flea Market", IBM Research Division: Research Report, pp. 1-18, Jul. 28, 1994.

"Unusual Farmland Auction Set," Harrison Scott Publications, Liquidation Alert, Mar. 28, 1994.

"The Computer Museum brings auction block to cyberspace in First Internet Auction," *Business Wire*, Mar. 14, 1994.

Freeman, Brian and Gideon, Lidor, "Hosting Services—Linking the Information Warehouse to the Information Consumer," IEEE 1994 Spring Conference, pp. 165-171.

Speidel, Richard E. & Schott, Lee A., "Impact of Electronic Contracting on Contract Formation Under Revised UCC Article 2, Sales", C878 ALI-ABA 335, Dec. 9, 1993.

Booker, Ellis, "Mega Real Estate Auction Counts on Imaging," *Computerworld*, p. 20, Dec. 7, 1992.

Abstract: "A forward/reverse auction algorithm for asymmetric assignment problems," Computational Optimization and Appliactions, Dec. 1992.

Hainer, Cathy and Grossman, Cathy Lynn, "Where Vactioning Kids Get Good Care", *USA Today*, Apr. 1, 1992, p. 4D.

Abstract: "Marketel Shuts Doors," *Travel Agent Magazine*, Mar. 23, 1992.

Del Russo, Laura, "Ticket-Bidding Firm Closes Its Door," *Travel Weekly*, Mar. 12, 1992.

"Newsletters," *The Atlanta Constitution*, Mar. 1, 1992, p. K13.

"CRTL's Blue Ribbon Deals for 1992," *Consumer Reports Travel Letter*, Jan. 1992, vol. 8, No. 1, pp. 3-5.

"Traveler's Notes; Bookit Report," *Comsumer Reports Travel Letter*, Dec. 1991, p. 143.

Feldman, Joan M., "To Rein In Those CRSs; Computer Reservation Systems," Air Transport World, Dec. 1991, p. 89.

"MONEY BRIEFS; Buy Low, Fly High," Gannett News Service, Nov. 20, 1991.

"Buy Low, Fly High,"*USA Today*, Nov. 14, 1991, p. 15.

Traveler's Notes; Easier airfare Bidding, Consumer Reports Travel Letter, Oct. 1991, p. 119.

Nelson, Janet "Practical Traveler; Airlines Relaxing Policy on No-Refund Tickets," *The New York Times*, Sep. 22, 1991, p. 3, Section 5.

Pelline, Jeff, "New Service; Now You Can Make a Bid on Your Next Airline Ticket Home", *The Orange County Register*, Sep. 1, 1991, p. E01.

"Bookit Airfare Bidding System (Fax for Your Plane Ticket?)", *Consumer Reports Travel Letter*, Sep. 1991, pp. 97 & 106.

Cass Maxine, "West Coast Agents Remain Skeptical About New Air Ticket Sales Plan; Marketel: Airline Ticket Sales System Sparks Concern," *Travel Agent Magazine*, p. 50, Sep. 2, 1991.

Upton, Kim "French Say Monoliths Off-limits to Visitors," *Los Angeles Times*, Aug. 25, 1991.

Pelline, Jeff, "Travelers Bidding on Airline Tickets; SF Firm Offers Chance for Cut-Rate Fares," *San Francisco Chronicle*, Section A4, Aug. 19, 1991.

Carey, Christopher, "Firm Offers Auction for Airline Tickets," *St. Louis Post-Dispatch*, Aug. 7, 1991, p. 1B.

Del Rosso, Laura, Marketel Says It Plans to Launch Air Fare 'Auction' in Jun.,*Travel Weekly*, Apr. 29, 1991.

"Bookit!, Airline Ticket Purchase Order for Business & Leisure Travel," Marketel International, Inc., 1991.

NASDAQ Adds Enhancements to SOES Limit Order File, *Securities Week*, Nov. 26, 1990, p. 5.

Inhaber, Herbert, "How to Solve the Problem of Sitting Nuclear Waste," *Transactions of the American Nuclear Society*, vol. 62, Nov. 11-15, 1990.

Dyson, Esther, "Information, Bid and Asked," Forbes, Aug. 20, 1990.

Ritter, Jeffrey B., "Scope of the Uniform Commercial Code: Computer Contracting Cases and Electrical Commercial Practices," *45 Bus. Law 2533*, Aug. 1990.

Greenburg, Peter, S., "Judging DeRegulation," *The Record*, Jul. 22, 1990, p. T01.

Greenburg, Peter, S., "The Savvy Traveler: Lower Air Fares for Consumers Not in the Cards; Airlines: Remember When It Cost $16 to Fly from Los Angeles to San Francisco? Then You Remember the Days Before DeRegulation. Since Then, Prices Have Soared," *Los Angeles Times*, Jul. 8, 1990, p. L2.

Wallace, David, "Company Planning to Let Fliers Bid on Airfares," *Philadelphia Business Journal*, Mar. 26, 1990, p. 15.

"Mercado electronico, El chance de regatear por computador," *CIENCIA Tecnologia E Informatica*, Mar. 21, 1990 (Translation enclosed).

Cole, Jeff, "Fare bidding plan could be the ticket," *St. Paul Pioneer Press Dispatch*, Mar. 11, 1990.

Miller, Ross M., "The Design of Decentralized Auction Mechanisms that Coordinate Continuous Trade in Synthetic Securities," *Journal of Economic Dynamics and Control*, pp. 237-253, 1990.

Koepper, Ken, "Room Inventory Auctioning: The Next CRS Generation," *Lodging*, Jan. 1990, pp. 26, 29-30.

"Letter to Business Extra," *The San Francisco Chronicle*, Dec. 26, 1989, p. C7.

"Business Briefing, Airline Seats May Go on the Auction Block," Insight on the News, Dec. 4, 1989.

"Business Travel Update, Automation," *Travel Weekly*, Nov. 27, 1989.

Schrage, Michael, "An Experiment in Economic Theory; Labs Testing Real Markets," *The Record*, Section B1, Nov. 26, 1989.

Schrage, Michael, Innovation/Micheal Schrage: Laboratory Experiments with Market Economics, *Los Angeles Times*, Nov. 23, 1989, p. D1.

Golden, Fran "AAL's Riga Doubts Marketel's Appeal to Retailers," *Travel Weekly*, Nov. 13, 1989.

Del Rosso, Laura, Firm Proposes ticket-bidding system; Marketel explores electronic auction of travel; Marketel International., *Travel Weekly*, Section No. 91, vol. 48, p. 1, Nov. 13, 1989.

Munro, Don and McCann, David, "A New Way to Purchase Travel, Automated Service Would Let Companies Bid for Already-Filled Airline Seats," *Business Travel News*, Nov. 6, 1989.

Carlsen, Clifford, "Polaris Group Set to Fly the Leveraged Sky," *San Francisco Business Times*, Nov. 6, 1989, p. 1.

"An Electronic Auction Ahead for Airline CRS's?", *The Business Week Newsletter for Information Executives*, Oct. 27, 1989.

Cohen, Danny, Electronic Commerce, *ISI Research Report*, University of Southern California, Oct. 1989.

Coyne, Andrew, "Unbundling ideas may alter world of politics," The Financial Post (Toronto), Section 1, p. 11, Sep. 27, 1989.

Kuttner, Robert, "Computers May Turn the World into One Big Commodities Pit," *Business Week*, Sep. 11, 1989.

Carlsen, Clifford, "From Airline Tickets to Human Organs, the Electronic Markets are Booming," *San Francisco Business Times*, Aug. 14, 1989, p. 17.

"From Airline Tickets to Human Organs, the Electronic Markets are Booming," *Times*, vol. 3, No. 50, Aug. 14, 1989.

"Public May Submit Bids to Get Bargain Rates," *Wall Street Journal*, Section 2, p. 1, Column 1, Aug. 1, 1989.

"AUCNET: TV Auction Network System," Harvard Business School, Jul. 19, 1989.

Malone, Thomas W., et al., "Electronic Markets and Electronic Hierarchies," *Communications of the ACM*, vol. 30, No. 6, Jun. 1987.

Sammer, Harald W., "Online Stock Trading Systems: Study of an Application," IEEE 1987 Spring Conference, pp. 161-162.

Littlefair, T., "Homelink: A Unique Service," *Computer Bulletin*, pp. 12-14, Jun. 1986.

Banatre, Jean-Pierce, et al., "The Design and Building of Echere, a Distributed Electronic Marketing System," *Communications of ACM*, vol. 29, No. 1, Jan. 1986.

Turoff, Murray and Chinai, Sanjit, "An Electronic Information Marketplace," *Elsevier Science Publisher* B.V., pp. 79-90, 1985.

Banatre, Michel, "Distributed auction bidding system," IPC Business Press, Computer Communications, vol. 4, No. 4, Aug. 1981

American Airlines Internet Silent Auction, selected pages downloaded from www.americanair.com, Aug. 1996.

Apollo Host Computer, selected pages downloaded from www.apollo.com.

"Auctioning unsold airline tickets." (http://www.newciv.org/GIB/BOV/BV-409.HTMI), p. 1, Sep. 28, 1999.

Cathay Pacific: Cyber Traveler Auction #3 —Official Rules, selected pages downloaded from www.cathaypacific.com, Rules updated Jul. 30, 1996.

CSM Online: About Collector's Super Mall downloaded from www.csmonline.com, Apr. 23, 1998.

Sabre Decision Technologies, selected pages downloaded from www.sabre.com.

PhoneMiser: Frequently Asked Questions, downloaded from www.phonemiser.com, Jul. 14, 1996

The United Computer Exchange: How It All Works, selected pages downloaded from www.uce.com, Apr. 10, 1998.

"What's Holding Up E-Cash?", *Cybernautics Digest*, vol. 3; No. 7, Finance, Sep. 8, 1997.

Tired of Shopping for the Best Home Loan?, Mortgage Loan Specialists.

Business Week (Industrial Edition) Jan. 19, 1987.

"Sold!. . . To The Lowest Bidder," *Computer Finance*, vol. 6, n. 2, PN/A, Jul. 1995, Dialog File 636, Accession No. 02778780.

Messmer, "Car Dealer Markets Automobile On-Line"; *Network World*; v11 n23; pp. 15; Jun. 6, 1994; Dialog: File 15, Acc# 00871063.

Johnson; "Using PCs and Windows NT to Sell Rover Cars"; *PC User*; n238; p35(1); Jun. 29, 1994; dialog: File 275; Acc#01699166.

\* cited by examiner

ONLINE PRODUCT EXCHANGE SYSTEM

CROSS-REFERENCED RELATED APPLICATIONS

This is a continuation of application Ser. No. 08/550,455, filed Oct. 30, 1995, which is a continuation-in-part of Ser. No. 08/512,365, filed Aug. 8, 1995, now abandoned.

FIELD OF THE INVENTION

The present invention generally relates to vehicle purchase systems, and more particularly, to an exchange system accessible via a communications network which facilitates the purchase of new vehicles.

BACKGROUND OF THE INVENTION

When purchasing a product, a purchaser must first determine which product, including brand name, model, color and other features, best meets his needs. Once the purchaser has an established interest in purchasing a particular product, the purchaser typically visits, in person or by telephone, a few stores that sell the product to determine the best price. Once the best price is determined, all things being equal, the purchaser usually buys from the store selling this particular product at the best price.

Although visiting a dealer generally is a necessary element of the car purchasing process, many potential purchasers do not enjoy meeting with a sales person and having to negotiate a purchase. For example, a potential purchaser may want to first ascertain the various options and prices before discussing a purchase with a sales person.

In addition, visiting a dealer requires the purchaser to set aside at least a few hours of time. Even after visiting a dealer, however, the potential purchaser may not be totally comfortable in making a purchasing decision. For example, the purchaser may want to visit a number of other dealers to determine a competitive price for the particular car of interest. The purchaser, therefore, may visit a number of dealers that are within a reasonable distance from the purchaser's residence. Visiting many dealers usually requires a significant amount of time. It is not unusual for a potential purchaser to spend weeks visiting various dealers in an attempt to understand and locate the best deal.

Further, once a purchaser identifies a particular car, the purchaser then typically attempts to negotiate the best price from the dealer. These negotiations, for many purchasers, are the most difficult steps in the car purchasing process. Further, when coupled with options, factory invoice, advertised specials and volume buyer discounts, these negotiations may become complex and confusing.

In an attempt to assist car purchasers in the purchase of a new car, many types of services have been created. For example, magazines provide potential purchasers with detailed information regarding particular cars. Some services provide a wide variety of information accessible through a computer network such as Internet.

Known magazines and systems, however, generally do not fully facilitate negotiating the car price. For example, although the purchaser may be better informed, in general, about a particular car as a result of reviewing a particular magazine source, the purchaser may not be provided with the price or the detailed information with respect to cars readily available within a specific geographic region. In addition, in known magazines and "on-line" services, all pricing information is limited to "list" price and "invoice" price, and possibly a suggested discount percentage. Further, such systems do not provide a mechanism to allow a potential purchaser to "lock in" a final purchase price. Also, such magazines and systems do not eliminate the negotiation process and in some instances in which unrealistic expectations are created, may even make the negotiations more difficult.

Accordingly, it would be desirable and advantageous to provide a car exchange system which enables a potential car purchaser to easily and quickly review all options, factory discounts and other information regarding specific car configurations of interest in combination with final pricing information for cars in a particular geographic region. It also would be desirable and advantageous to eliminate the car purchase negotiation process by providing an exchange system which enables a potential car purchaser to ascertain the best price for a particular car and to "lock in" to a specific dealer offer via the system without having to make prior direct contact with a particular dealer.

An object of the present invention is to simplify and reduce the time required, for both the buyer and seller, in completing a vehicle sales transaction.

Another object of the present invention is to enable potential purchasers to quickly and easily ascertain dealer offers for the sale of cars in a particular geographic region of interest.

Still another object of the present invention is to provide a car exchange system which enables a potential car purchaser to easily and quickly review all options, factory discounts and other information regarding specific car configurations of interest in combination with final pricing information for cars in a particular geographic region.

Yet another object of the present invention is to provide an exchange system which enables a potential car purchaser to ascertain the best price for a particular car and to "lock in" to a specific dealer offer via the system without having to make prior direct contact with a particular dealer.

SUMMARY OF THE INVENTION

These and other objects and advantages are achieved by a car exchange system which includes, in one embodiment, a file server having a plurality of databases storing specific information related to cars offered for sale by dealers. The exchange system further includes a processor coupled to the databases and programmed to perform certain tasks in response to price inquiries, special requests, offers to sell, offers to buy and acceptance of such offers.

Specifically, the exchange system is coupled to a communications link, such as the telephone lines or the Internet. A potential car purchaser may access, from a remote site, the exchange system via the network, and submit requests to such system. In response to some requests, the system processor retrieves stored data from the respective databases, and causes such data to be transmitted to the remote site for display. The exchange system also executes certain functions in response to commands and data transmitted from dealer sites and institution sites, e.g., banks or other lenders. The system enables a potential purchaser to, for example, browse the offers in a particular geographic region for the particular car and options of interest and to lock-in to a particular offer to sell.

The system described above enables a potential car purchaser to easily and quickly review all final pricing information for a variety of cars and configurations in a particular geographic region. In addition, such system eliminates, if desired by the buyer, the negotiation process by enabling a potential car purchaser to "lock in" a specific dealer offer via the system.

DETAILED DESCRIPTION OF THE DRAWINGS

Figure 1:
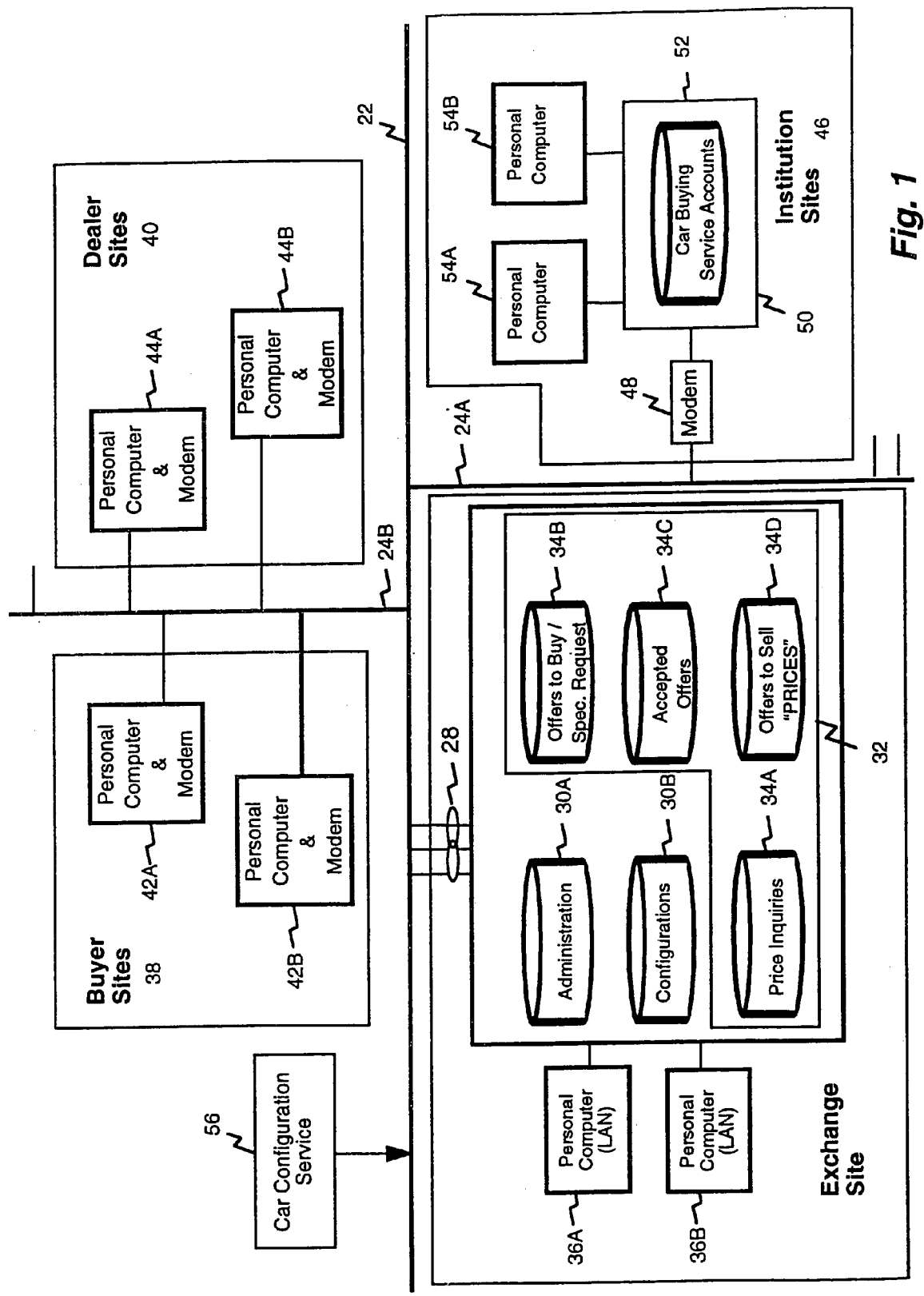
FIG. 1 illustrates a system architecture for a system in accordance with one embodiment of the present invention.

FIG. 1 illustrates a system architecture for a system 20 which includes a communications network 22 having multiple branches 24A–B. Network 22 may, for example, be a wide area network such as the network known as "Internet" or may be one of many other types of networks. Accordingly, although one embodiment of the present invention is described below in the context of a network such as Internet, it should be understood that the present invention may be used in connection with many other types of communications networks.

One embodiment of an exchange system 26 is illustrated in FIG. 1 as being coupled to network 22 via a multi-line communications control and router 28. System 26 includes, for example, a file server having a processor and memory storage. Such file servers are commercially available, such as the IBM RS-600 or HP-9000. Databases 30A–B and 32 are illustrated as forming a part of system 26. Databases 30A–B and 32 would, for example, be part of the memory storage of the file server.

Administration database 30A is utilized for storing data related to tasks executed by system 26. Configurations database 30B stores data related to specific car configurations which may be accessed, via network 22, from remote sites. Database 32 includes a price inquiries database 34A, an offer to buy and special request database 34B, an accepted offers database 34C and an offers to sell ("prices") database 34D. A plurality of personal computers such as personal computers 36A and 36B are coupled to system 26 via a local area network (LAN) to enable access to system 26 without requiring access to network 22.

Buyer sites 38 and dealer sites 40 are shown as being coupled to branch 24B of network 22. Particularly, potential buyers, through personal computers and modems 42A and 42B, may access exchange system 26 via network 22. Similarly, dealers, through personal computers and modems 44A and 44B, may access exchange system 26 via network 22. Of course, the functions performed by system 26 for such buyers and dealers are different, as explained hereinafter in more detail.

Institution sites 46 are shown as being coupled to branch 24A of network 22. Such institutions may include lending institutions such as banks. Institutions may access exchange system 26 through modem 48, coupled to a file server 50 having a car buying service accounts database 52, and via personal computers 54A and 54B. Account information for car purchases made by buyers at buyer sites 38 via system 26 may be stored in database 52.

It should be understood, of course, that the architecture illustrated in FIG. 1 may vary depending upon the network utilized. Also, many additional buyer sites 38, dealer sites 40 and institution sites 46 may be coupled to system 26. Further, a geographic area such as a country, e.g., the United States of America, could be divided into regions with separate systems 26 serving such regions.

Figure 2:
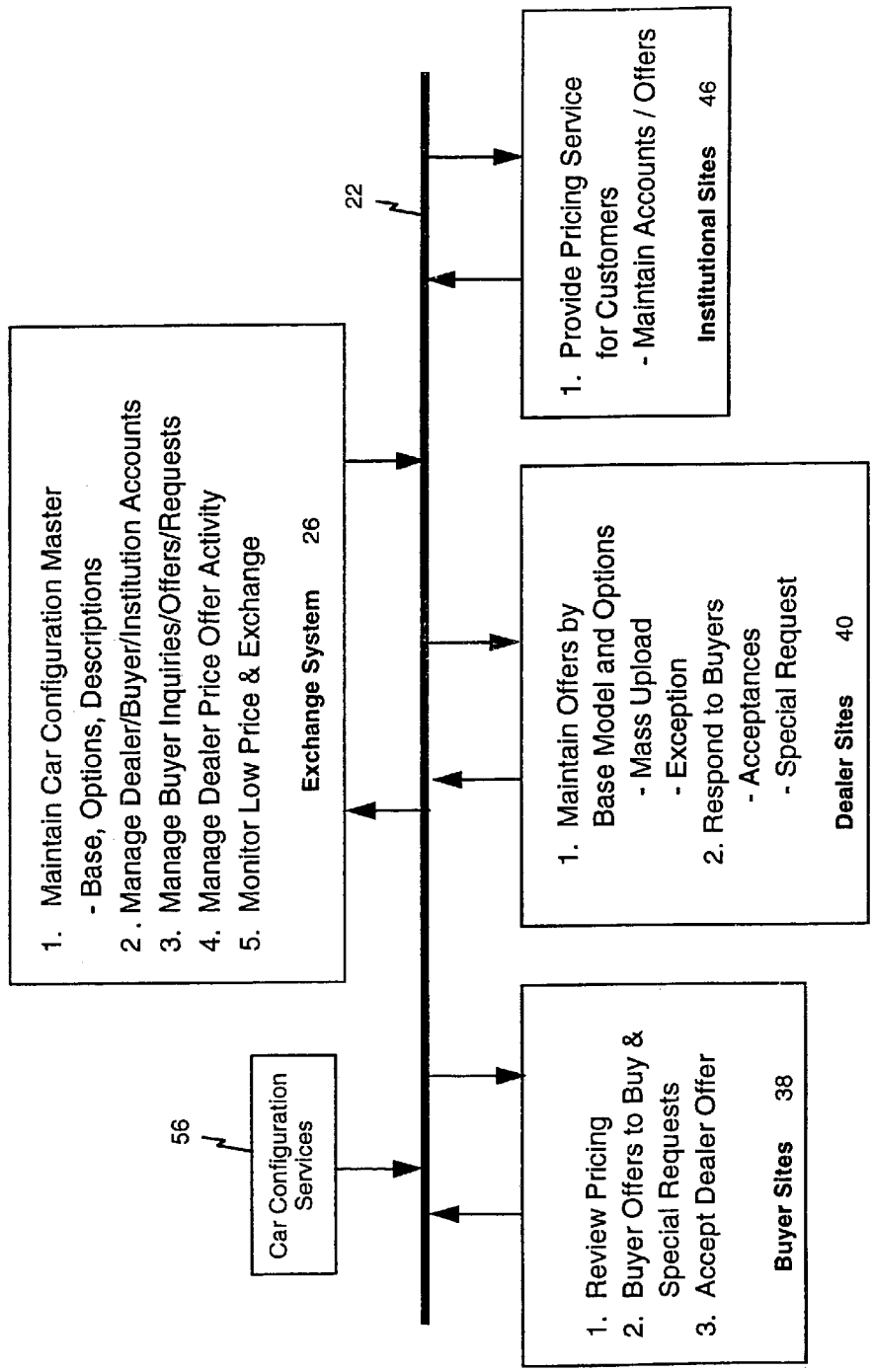
FIG. 2 is a functional block diagram illustrating the tasks performed by each hardware block shown in FIG. 1.

FIG. 2 illustrates, for sites 38, 40 and 46 and system 26, some functions performed at such sites 38, 40 and 46 and by system 26. More specifically, with respect to system 26, car configuration master files which include a base description, an options description and descriptions of other information pertinent to particular cars, are maintained by system 26. System 26 also maintains specific accounts related to dealers, buyers and institutions that use system 26. Certain activities also are tracked, for example, for buyer inquiries, offers and special requests, by system 26. Further, dealer price offer activity and specific price offers are maintained within databases in system 26.

With respect to buyer sites 38, at such sites, a potential buyer may, via personal computer and modem 42A–B, enter commands to cause system 26 to execute routines to enable such buyer to review pricing, make offers, special requests and accept a dealer offer. At dealer sites 40, dealers may, via personal computer and modem 44A–B, enter commands to cause system 26 to execute routines to enable such dealer to, by a mass upload to system 26 or by exception, maintain offers by base model and options in databases of system 26. In addition, dealers may respond to specific buyer acceptances and special requests communicated to dealer sites 40 from buyer sites 38 via system 26. The manner in which certain functions are executed by system 26 is described hereinafter in more detail.

At institution sites 46, institutions may provide pricing service for customers, such as providing, via system 26, information regarding loans. Such institutions may also maintain, in file server 50, information regarding individual accounts and offers.

Car configuration services 56 may provide data to system 26 related to particular car makes and models. In this manner, system 26 may compliment existing services which provide, on-line, car configuration information.

Figure 3:
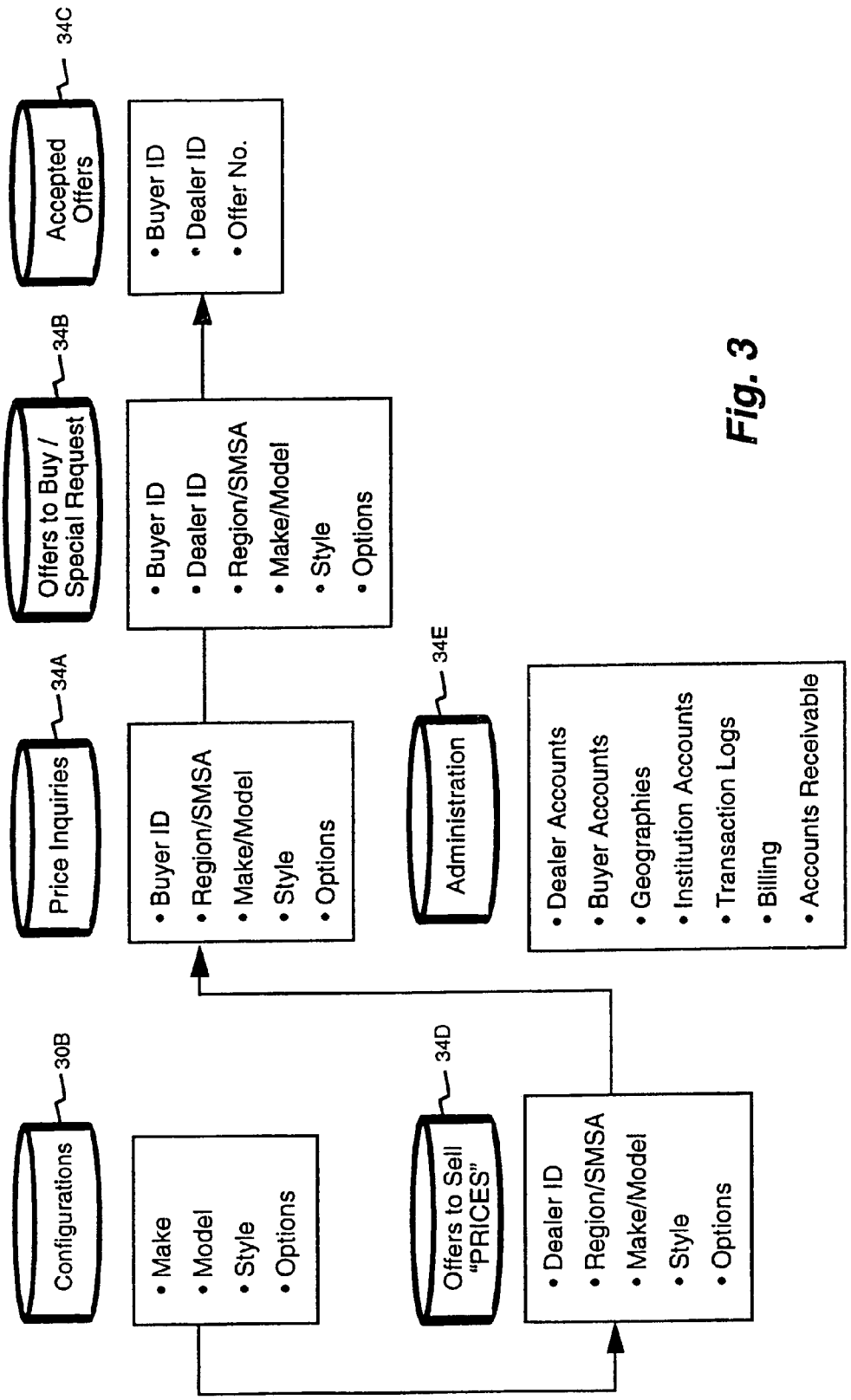
FIG. 3 illustrates the system database structure for the system illustrated in FIG. 1.

FIG. 3 illustrates various types of information stored in databases 30B and 34A–E of exchange system 26. No particular hierarchy is intended to be expressed or implied by the arrows shown in FIG. 3. Rather, such arrows are only intended to facilitate an understanding of such data and the interrelationships. Further, it should be understood that although specific databases are referred to, the data in any one of the databases may be distributed or combined in many different configurations with data from other databases. Therefore, the database configuration illustrated in FIG. 3 and described below is provided primarily to facilitate an understanding of system 26, and should not be construed as a limitation of system 26.

Referring specifically to FIG. 3, in configurations database 30B, information regarding new cars is stored. Such information includes, for each designated car, make, model, style and options information. Such information typically provides a detailed description of each particular car. Note that although information regarding a particular car may be stored in configurations database 30B, a particular dealer may not have made a specific offer for that specific configuration. Therefore, data stored in configurations database 30B may not necessarily match information stored in offers to sell database 34D.

With respect to offers to sell database 34D, information such as an identification of the dealer making an offer, the dealer region, and pricing information by make/model, style and options is stored. Such information identifies, by dealers having specific geographic selling locations, offers to sell certain cars.

In price inquiries database 34A, information related to potential buyer inquiries is stored. Such information includes an identification of each buyer, by identification number, who makes an inquiry to offers to sell database 34D, the buyer's geographic region, and the car make/model, style and options which were the subject of the buyer inquiry.

Buyer offers and special request database 34B is utilized by system 26 for storing information related to offers made by buyers and special requests made by potential buyers, via system 26, to a dealer. For example, a buyer may request an updated price offer based on a unique selection of options. For each such buyer offer and special request, buyer and dealer identifications, geographic region, and make/model, style and options information is stored in database 34B.

System 26 stores, in accepted offers database 34C and for each offer accepted via system 26, an identification of the buyer and dealer and an offer number, which is assigned to the accepted offer by system 26. Such information may be used, for example, for billing purposes.

With respect to administration database 34E, information related to dealer accounts, buyer accounts, and geographic locations for buyers and dealers is stored. Also, institution accounts, transactions logs, system billing, and accounts receivable information is stored in such database 34E.

As pointed out above, the specific architecture and structure of databases 30B and 34A–E may, of course, vary and is not limited to the specific structure illustrated in FIG. 3. In addition, although databases 30B and 34A–E are shown as being separate, such databases could be consolidated or distributed in many other configurations. Further, information in addition to the specific data described above could be stored in, and form a part of, such databases.

Figure 4:
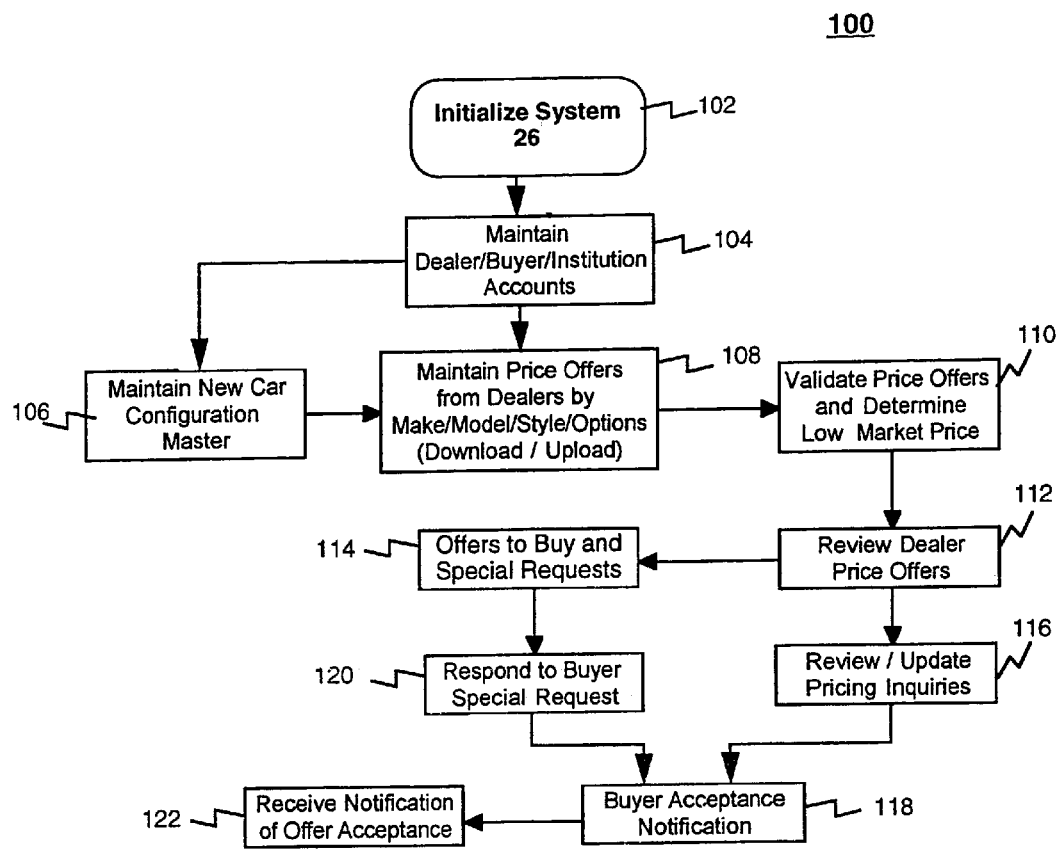
FIG. 4 illustrates a sequence of steps executed by one embodiment of the exchange system as part of the car purchasing process.

FIG. 4 illustrates functions 100 performed by exchange system 26. Functions 100 are illustrated in a logic diagram form. However, it should be understood that such functions 100 could be performed in any sequence, in a distributed manner, or in parallel, and no specific execution order is intended, expressed or implied, by such flow. Also, any one of the functions illustrated in FIG. 4 could be performed without necessarily performing, within a certain time limitation, any of the other functions.

Referring now particularly to FIG. 4, upon initialization 102 of system 26, functions performed by system 26 include maintaining dealer, buyer and institution accounts 104, maintaining new car configuration masters 106, and maintaining price offers by dealers by make, model, style and options 108. Such maintenance functions are described hereinafter in more detail and generally require maintaining current information in the various databases of system 26.

Exchange system 26 also validates price offers 110. For example, once a dealer at a dealer site 40 communicates a specific offer to sell a car, system 26, prior to loading such offer in database 34D, displays the information which is the subject of the offer to the dealer. If the information is correct, the dealer enters a command on computer 44A, for example, and system 26 then loads the validated information into database 34D.

System 26 also is configured to determine, upon receiving a buyer command, a low market price 110 for a selected specific configuration within a designated geographic region. Particularly, a potential buyer at a buyer site 38 may want to place a specific "offer to buy" or identify a specific desired car configuration and a particular geographic region in which such buyer would be willing to travel within to obtain a car. Such information is then loaded into computer 42A, for example, through a graphical user interface. Such information is then transmitted to system 26. Using such inputted information, offers to sell database 34D is scanned to identify matches for the selected car configuration offered for sale in the selected geographic region. The selling prices are then compared for such matches, and the lowest selling price is then caused to be displayed by system 26 at computer 42A. Exchange system 26 also enables, upon receipt of a buyer command, a buyer to review dealer price offers 112 for a variety of cars.

If a buyer desires to make an offer or a special request of a dealer, such requests may be made to a dealer 114 through system 26. Exchange system 26 also enables a buyer to review and update pricing inquiries 116, and if a buyer accepts a dealer offer via system 26, system 26 generates a buyer acceptance notification 118.

With respect to offers to buy and special requests 114, exchange system 26 communicates such offers and requests to the buyer designated dealer and enables such dealer to respond to the offer or request via system 26. If a dealer response to a special request is acceptable, the buyer may accept the dealer's offer and system 26 will generate acceptance notification 118. Exchange 26 also generates, for the dealer, a notification of offer acceptance 122. Of course, if a dealer accepts an offer to buy 114, exchange 26 generates a notification of the dealer acceptance.

Figure 5:
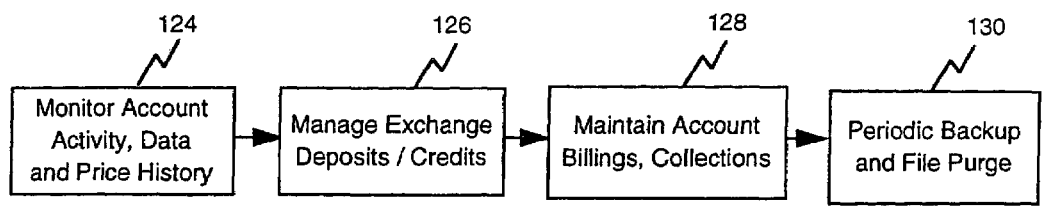
FIG. 5 illustrates the various administrative tasks performed by the exchange system.

Administration tasks performed by system 26 generate data to be stored in administration database 38 (FIG. 1). More specifically, and as shown in FIG. 5, system 26 monitors account activity and data 124, manages deposits and credits 126, maintains account billings and collections 128 and performs periodic backup and file storage operations 130. Data related to such activities is loaded in administration database 30A and may later be utilized, for example, to generate buyer and dealer billing for access and use of system 26.

Figure 6:
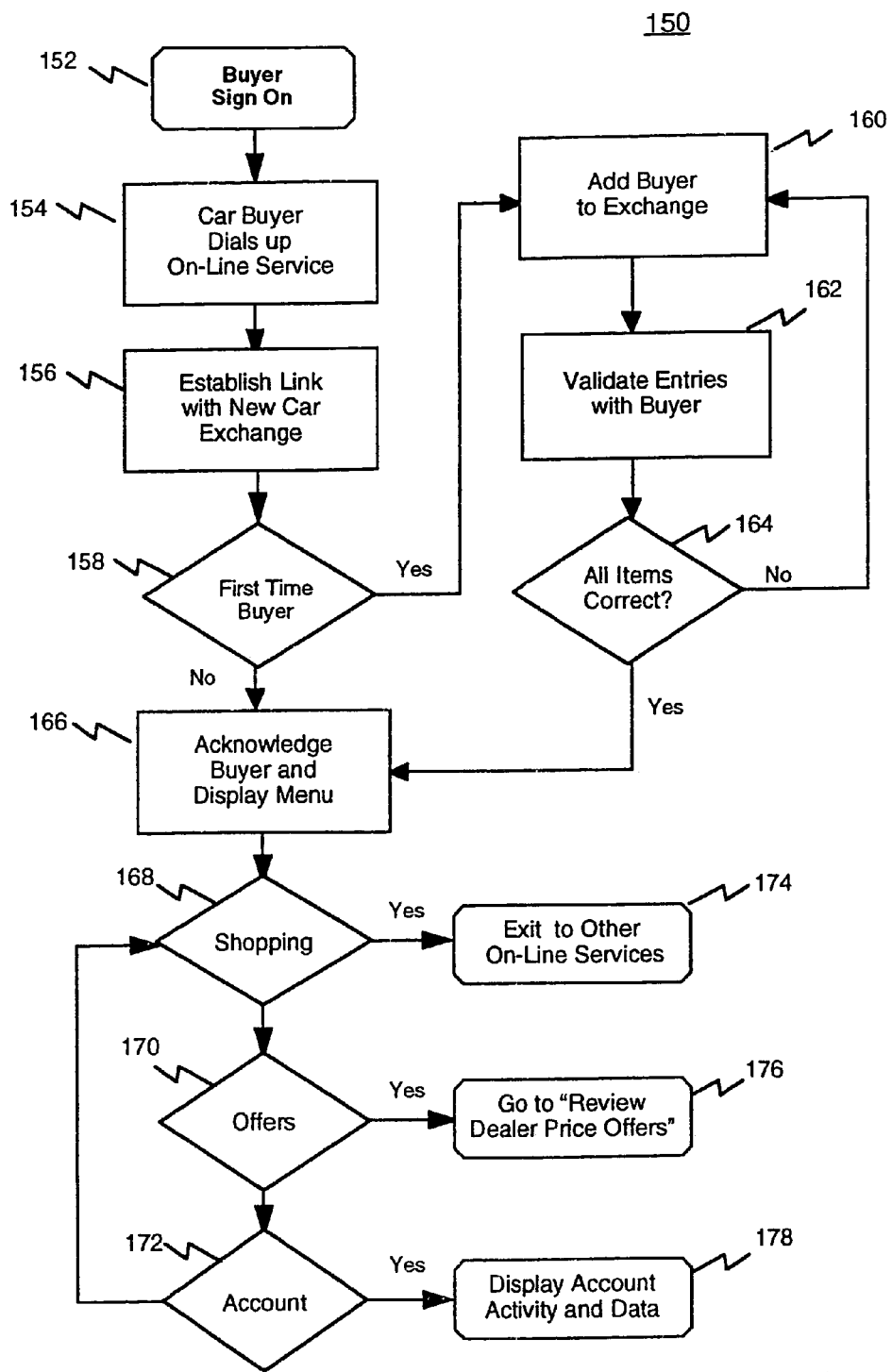
FIG. 6 illustrates one embodiment of a sequence of process steps executed to access the exchange system.

FIG. 6 illustrates a sequence of process steps 150 executed in connection with performing a buyer sign-on 152 to exchange 26. Specifically, to perform a sign-on 152 at a buyer site 38 (FIG. 1), personal computer 42A, for example, first accesses network 22 via an on-line service 154 such as CompuServe. A link 156 is established through communications network 22 with system 26. System 26 then requests buyer identification information to determine whether the specific user is a first-time potential buyer 158. If the buyer is a first time user, then buyer information is added 160 to the administration database 30A. System 26 then validates the buyer's entries 162, for example, by displaying such entries to the buyer at computer 42A. If all the entries are not correct 164, then the buyer may edit such entries. Otherwise, if the entries have been correctly entered, system 26 acknowledges proper access by the buyer and displays a menu 166 at personal computer 42A, for example. If the buyer is not a first-time buyer, operations would proceed directly to acknowledging the buyer and displaying a menu 166.

The menu displayed to a buyer, for example, is a graphical user interface which enables the buyer to select from various options such as shopping 168, offers 170, and account 172. Once the buyer has selected an option, system 26 responds to such selection. For example, if the buyer selects "shopping" 168, since this service is not executed by system 26, system 26 prompts the buyer to logoff system 26. On the other hand, if the buyer selects "offers" 170, then system 26 executes the sequence of process steps associated with reviewing dealer price offers 176. If the user selects account 172, then system 26 will cause account activity 178 for the subject buyer to be displayed at the buyer's computer.

Figure 7:
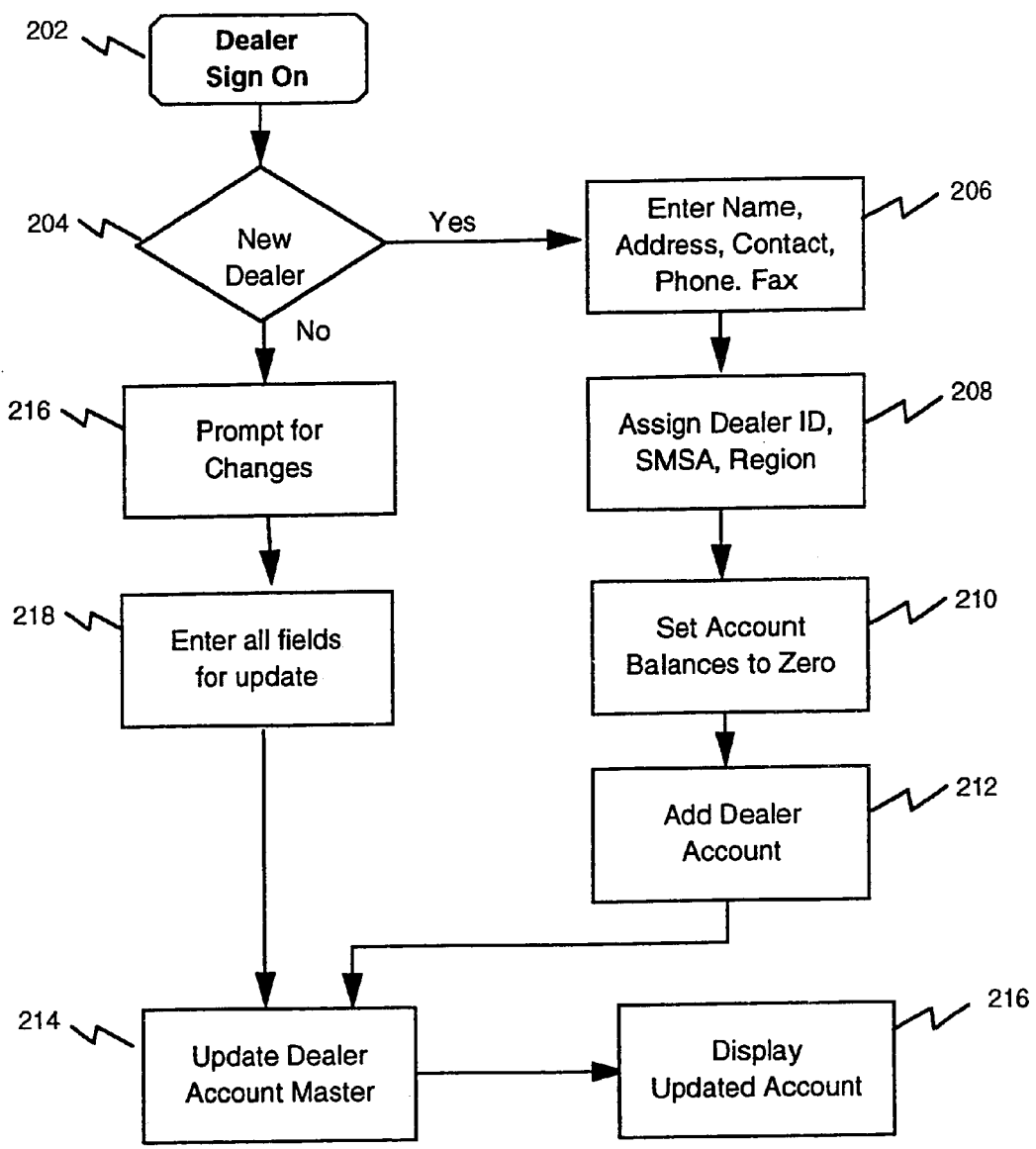
FIG. 7 illustrates a sequence of process steps to be performed in connection with creating a dealer account in the exchange system.

FIG. 7 illustrates a sequence of process steps 200 associated with a dealer sign-on operation 202. Specifically, a dealer accesses system 26 through a personal computer and modem configuration 44A, for example, through branch 24B of network 22. A communications link is then completed with system 26. Once a dealer has accessed system 26, system 26 determines whether the particular dealer is a new dealer to the system 204. Such a determination is made, for example, by checking the administration database 30A for the dealer identification.

If the dealer is a new dealer to system 26, then the dealer is prompted to enter name, address, contact, telephone and fax information 206. System 26 then assigns the dealer an identification number and an SMSA region 208. System 26 also sets all account balances for the dealer to zero 210 and adds the dealer account 212 to administration database 30A. Once such an account is established, the dealer may update the dealer account master information 214 stored in administration database 30A.

If the dealer is not a new dealer 204, then system 26 will prompt the dealer and request entry of new or updated data 216. A dealer may update information in any and all fields for information stored by system 26 with respect to such dealer 218. Once such data has been entered, then system 26 updates the account master for the dealer 214 stored in administration database 30A. Once all such information has been entered and stored by system 26, all the updated account information is caused, by system 26, to be displayed at personal computer 44A, for example, to enable the dealer to review such information and to ensure its correctness 216.

Figure 8:
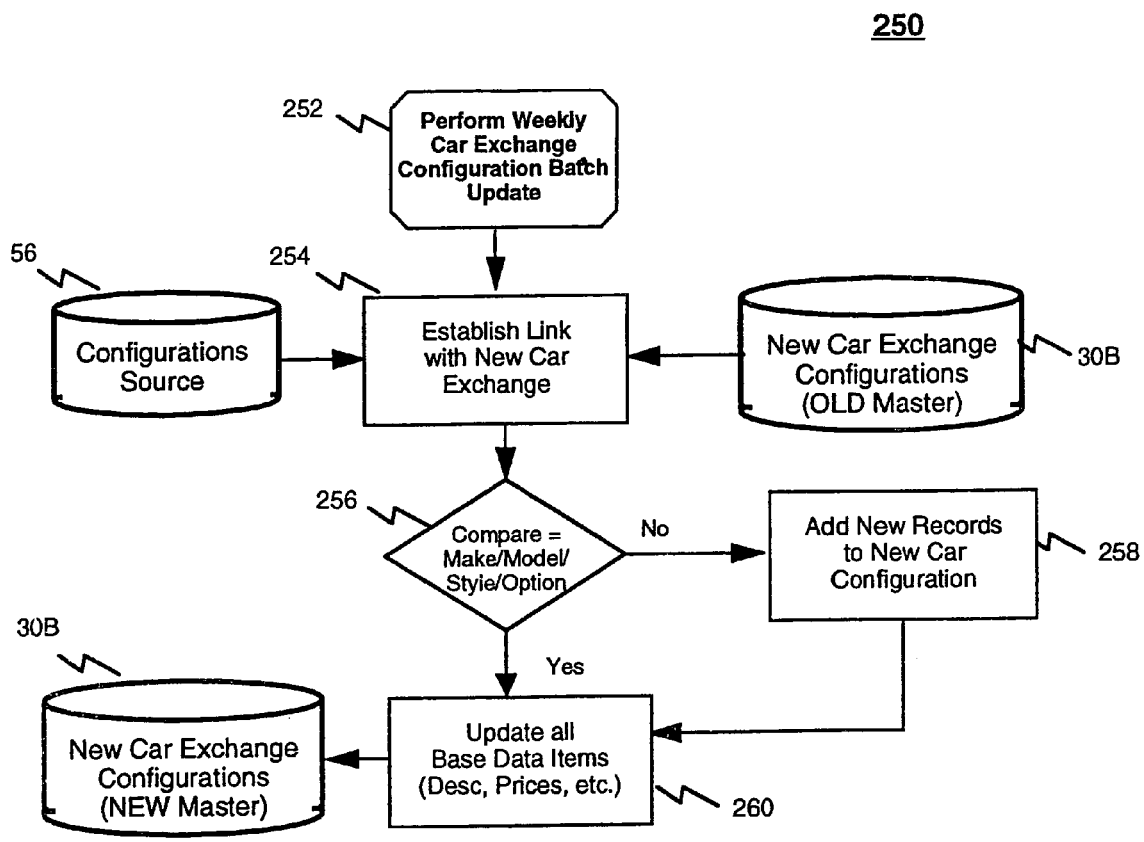
FIG. 8 illustrates the process steps executed in connection with updating configuration data stored in the configuration database of the system.

FIG. 8 illustrates a sequence of process steps 250 executed by system 26 to perform a batch update 252 of all car configuration data stored in configuration database 30B. Particularly, process steps 250 would be executed by system 26 on a weekly or some other regular basis. Such update would be performed to ensure that all new master files related to cars being offered through system 26 have been updated and saved in an appropriate manner.

Referring to process 250 in more detail, system 26 first reads/uploads the latest source file configurations from configurations database 30B. System 26 also may read/upload configurations from other sources such as third party configuration sources 56. Once such configurations are uploaded into active memory of system 26, then the newly entered car configurations since the last batch update, which may be stored in a buffer memory, are compared with the existing configurations in configurations database 30B at step 256. If for any particular car configuration such configuration does not exist in configuration database 30B, a new record is created for such new car configuration 258 and the new record is added to the other records which will be stored in configurations database 30B. If the car configuration is already stored in configurations database 30B, then operations proceed to block 260, where all information is updated 260 by copying all records in active memory of system 26 to configurations data base 30B. Such updated information in configurations database 30B forms the new master records which may be accessed by both buyers and dealers as described above.

Figure 9:
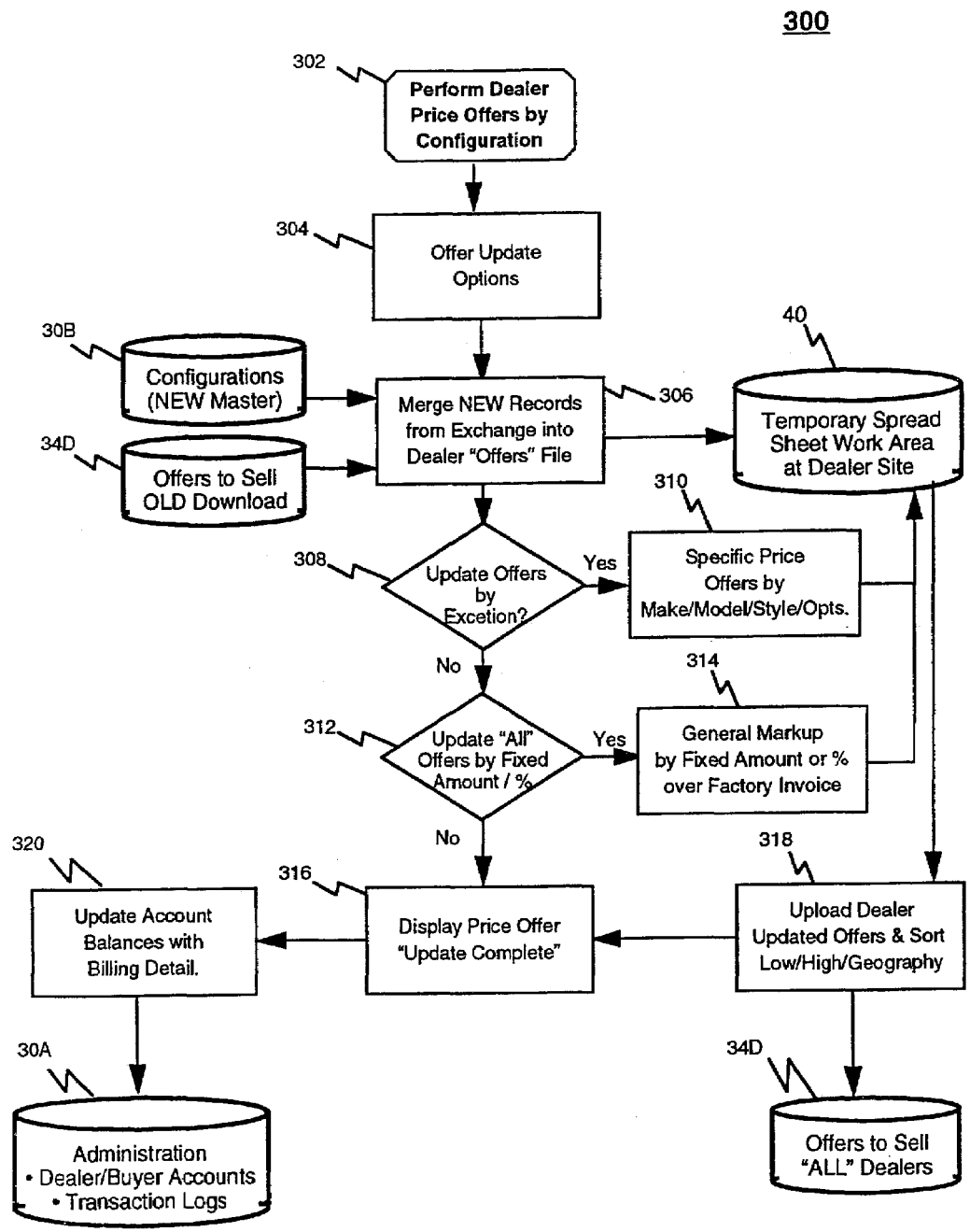
FIG. 9 illustrates the sequence of process steps executed in loading dealer offers into a system database.

FIG. 9 illustrates a sequence of process steps 300 which would be performed by dealer at a dealer site 40 on a personal computer and modem configuration 44A, for example, to enter an offer into system 26. More specifically, once a dealer at a dealer site 40 has initialized 302 system 26, system 26 prompts 304 such dealer as to whether such dealer would like to update dealer data stored in the various databases of system 26. System 26 then merges 306 information from car configurations database 30B for the most recently updated master records and from the offers to sell database 34D. Such information is merged by system 26 to form an integrated new record for an interim dealer's offer file at site 40 displayed at computer 44A. If the dealer determines to update or create new records, the dealer may modify the records as displayed and upon completion of such updating, the new/updated records are loaded to form an updated offers to sell database 34D. The dealer at the dealer site 40 also is prompted by system 26 as to whether such dealer would like to update the offers to sell database 34D for the dealer's records by exception 308. If a dealer does desire to update such offers by exception, then such dealer may update specific information, such as pricing information, by a selected amount or percentage 310. Such updated information is stored in the interim file and may subsequently be loaded into database 34D by system 26 at step 318.

If a dealer does not desire to update such offers by exception, the dealer is then prompted by system 26 as to whether such dealer would desire to update the pricing information for each configuration by a fixed amount or percentage 312. If a dealer would like to perform such an update, the dealer may indicate the general dollar amount mark-up or percentage over factory invoice at 314. Again, such updated information is stored in the interim file and may subsequently be loaded into database 34D by system 26.

If the dealer does not desire to perform any such updates, or once such updates have been completed via step 318, then system 26 causes the display at dealer site 40 to indicate that the price offer database update has been completed 316.

Administration database 30A is then updated with new account balances for the dealer performed functions 320. The dealer could, of course, have a price offer report printed-out at dealer site 40. If the dealer selects to have such information printed, then the price offer report is printed-out at the dealer site 40 from the updated records in offer to sell database 34D for that dealer by make, model, options and style.

Internally within system 26, and for current records within offers to sell database 34D for each car configurations, such records may be sorted by configuration to identify and store such information by lowest offer first. Such information may be stored in database 34D for all offers to sell in this manner.

Figure 10:
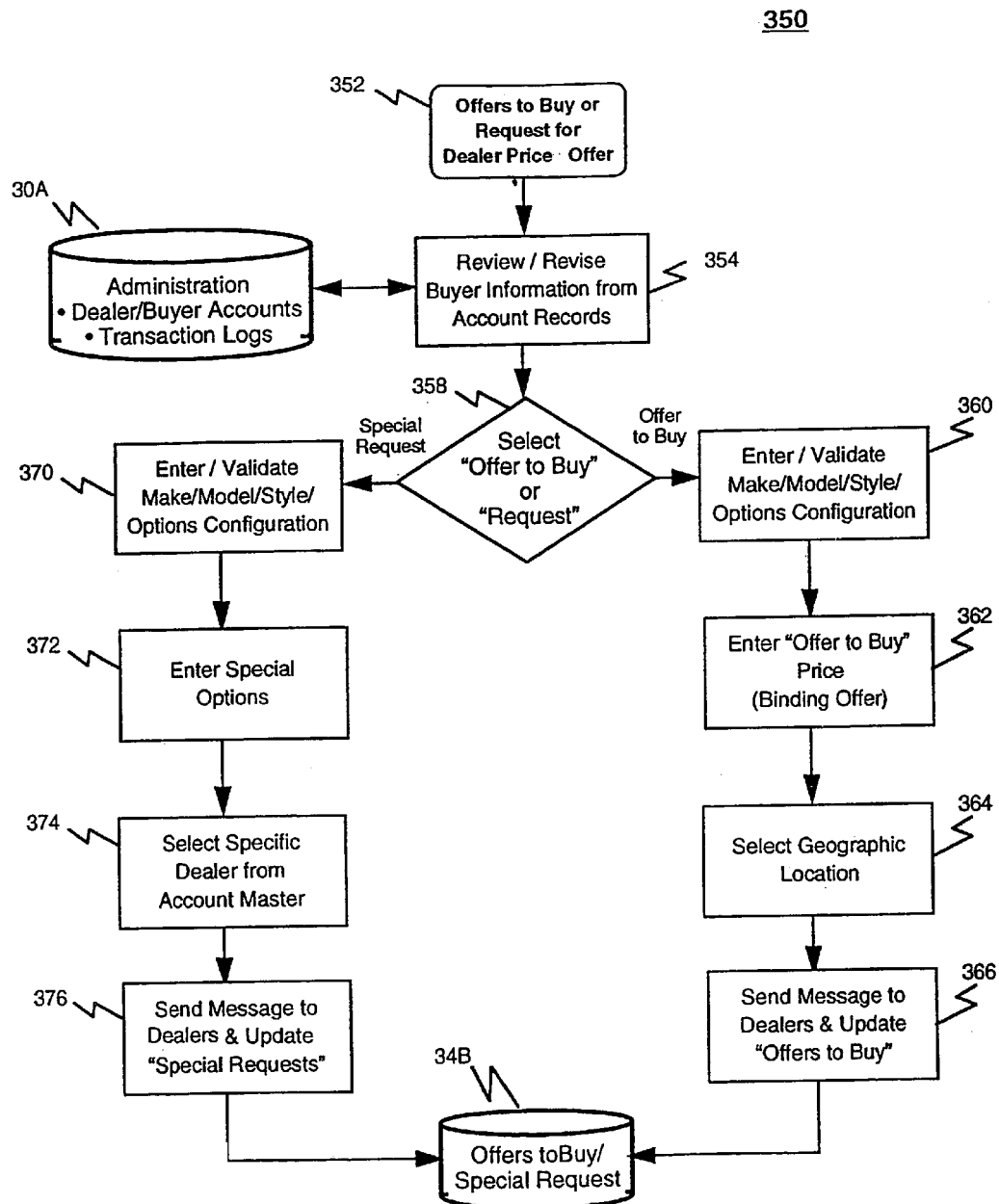
FIG. 10 illustrates a sequence of process steps associated with executing offers to buy and special requests.

FIG. 10 illustrates a sequence of process steps 350 associated with enabling a buyer at buyer site 38 to make an offer to buy in a selected geographic region or a special request to a specific dealer at a dealer site 40 via exchange system 26. Such operations are referred to as an offer to buy or a special dealer request. Particularly, once a buyer accesses 352 system 26 at a buyer site 38, the buyer sign-on process is executed as illustrated in FIG. 6 as process 150. Through such sequence of process steps, buyer information may be reviewed and revised 352 from administration database 30A.

The buyer may then enter and select a make, model, options and style of car which the buyer desires to purchase 354. The buyer then selects whether to make an "offer to buy" or a "request" 358. If the buyer desires to make an offer to buy, then the buyer enters and validates the specific car configuration related to the offer 360. Once such configuration information is entered, the buyer then enters the price 362 and selected geographic regions 364. Exchange system 26 then receives this information and sends an offers message to dealers within the selected geographic region 366 and updates offers to buy/special request database 34B.

If the buyers desires to make a request 358, then the buyer enters and validates the car configuration data related to the request 370, enters special options 372, and selects a specific dealer from the account master in database 30A of system 26. Exchange system 26 then receives the special requests, transmits the request to the specified dealer and updates the special requests database 34B with a copy of the subject request. The message may be stored, for example, at the personal computer 44A at the selected dealer site 40 and the message may be stored in an E-mail location specified by the dealer.

Figure 11:
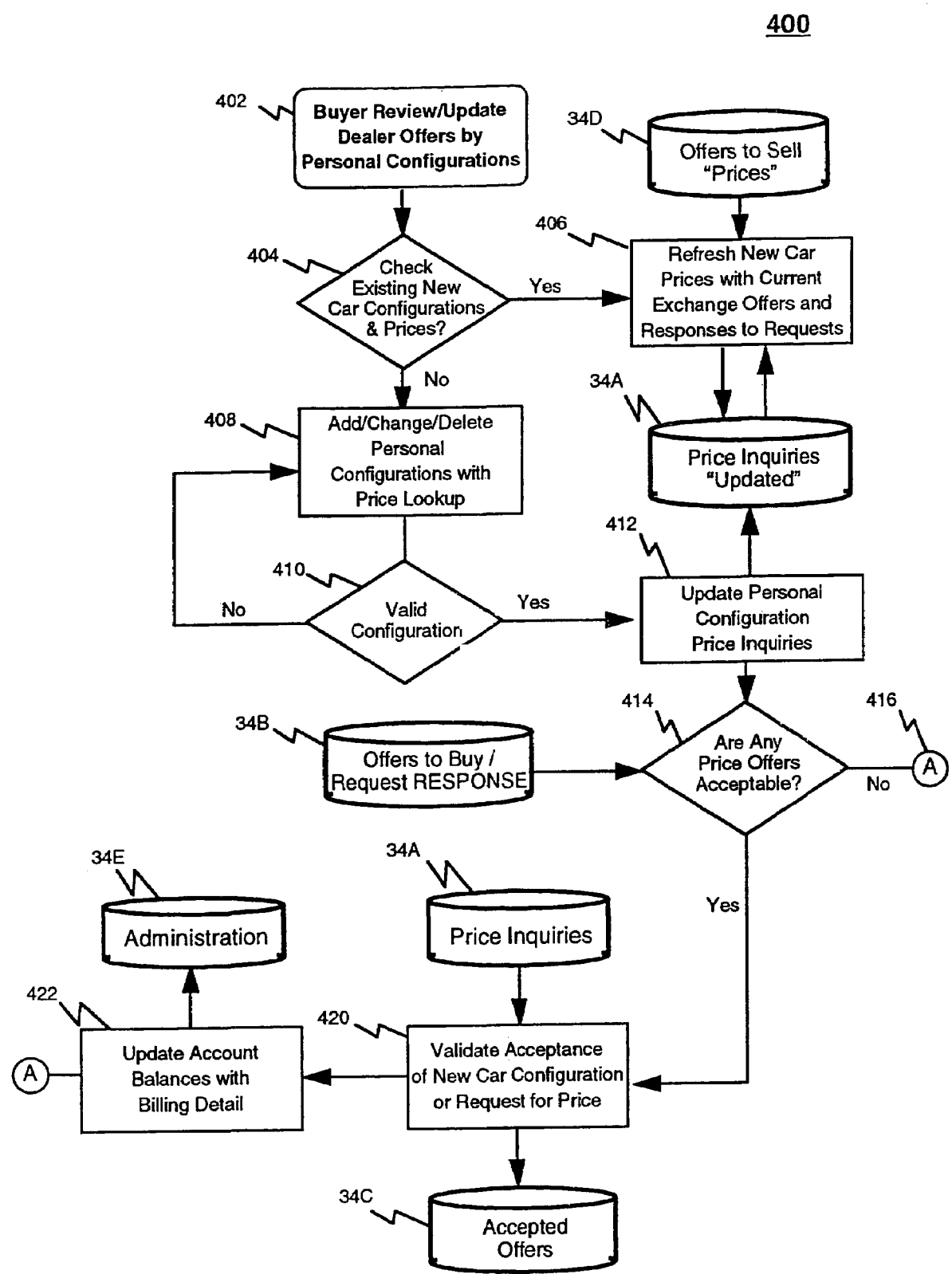
FIG. 11 illustrates a sequence of process steps associated with enabling a dealer to review/update prior offers contained in the offer to sell database of the system.

FIG. 11 illustrates a sequence of process steps 400 which would be executed by system 26 in connection with a buyer accepting a dealer offer from the offers stored in offer to sell database 34D. Particularly, a buyer at a buyer site 38, on a personal computer 42A, for example, accesses 402 system 26 and indicates whether the buyer wants to review existing dealer offers by configuration 404. If the buyer wants to review such existing configuration and price selections, then such information is obtained from the offers to sell database 34D and from any dealer responses in special requests database 34B, and such information is displayed to the potential buyer at step 406.

The buyer may add, change or delete a particular car configuration as indicated at a step 408. Specifically, if a buyer selects or desires to delete a particular configuration, the make, model, option and style would be deleted from the buyer's price inquiries which are stored in the price inquiries database 34A into the local memory of personal computer 42A.

Once a buyer has selected a particular configuration which the buyer desires to have pricing information on, system 26 first determines whether such a configuration is a valid configuration 410. Such a determination is made, for example, by comparing the selected configuration with the configurations stored in configurations database 30B. If the configuration is not valid, then operations return to step 408 in which a buyer may select a different configuration.

If the configuration is valid, operations proceed to step 412 in which for the particular configurations selected, the prices are obtained by system 26 from the offer to sell database 34D and such information is added to the particular configuration information currently then being displayed at personal computer 34A and are added to the price inquiry database 34A. If, upon the buyer's review, there is at least one offer which is acceptable 414, system 26 validates acceptance of the offer by rechecking the data and ensuring that the offer to sell from offer to sell database 34D is still current 420. If such information is validated, then the accepted offer information is stored in accepted offers database 34C and for the particular dealer and buyer, the account balances are updated 422 and stored in a buyer's accounts transaction log in system 26. If no offers are acceptable 414, processing proceeds directly to step 422.

Figure 12:
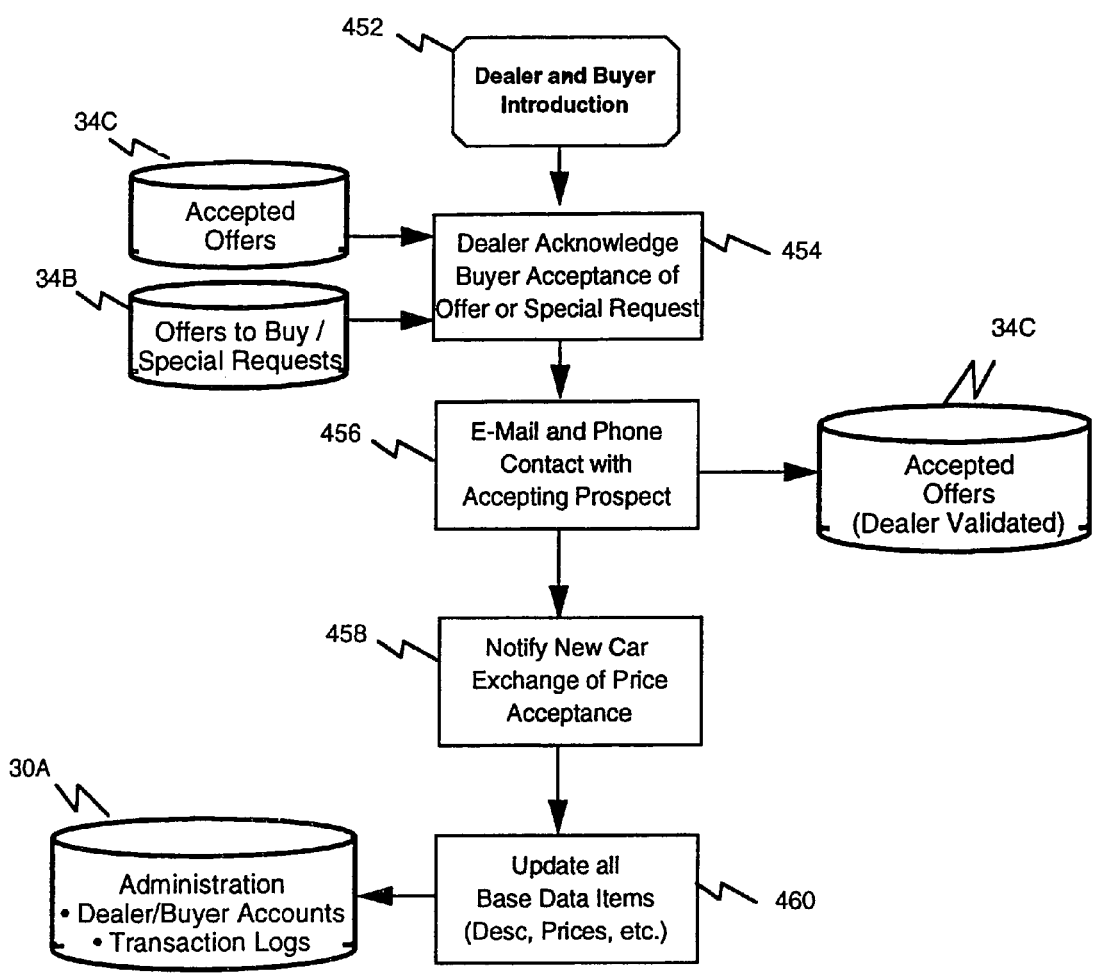
FIG. 12 illustrates a sequence of process steps executed in connection with acknowledgement of acceptance of an offer.

FIG. 12 illustrates a sequence of process steps 450 executed by system 26 in connection with the dealer and buyer introduction process 452. Particularly, once a buyer has accepted an offer in accordance with the sequence of steps 400 as illustrated in FIG. 11, the dealer that made the offer is informed of such acceptance by system 26 and may acknowledge, via personal computer 44A at dealer site 40, for example, the particular acceptance of the offer or a special request as stored in accepted offers database 34C and special request database 34B, as indicated at step 454.

Once the dealer receives information regarding such an acceptance as set forth in step 454, then the dealer may make contact with the potential buyer 456 via E-mail, telephone or even through system 26. If the transaction is concluded between the buyer and the dealer, then accepted offers database 34C is updated by the dealer at dealer site 40 and system 26 at step 458. System 26 then executes administrative tasks with database 30A as indicated at 460 and the dealer account, buyer account, transaction log is updated in administration database 30A.

The above described system 26 enables a potential car purchaser to easily and quickly review all options, factory discounts and other information regarding specific car configurations of interest in combination with final pricing information for cars in a particular geographic region. System 26 also eliminates the car purchase negotiation process by enabling a potential car purchaser to ascertain the best price for a particular car and to "lock in" to a specific dealer offer via the system without having to make prior direct contact with a particular dealer.

From the preceding description of an embodiment of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An electronic product exchange system comprising:
  (a) a file server accessible through a generally available wide area network:
    (1) from personal computers of a multitude of potential buyers coupled to the network, and
    (2) by a multitude of potential sellers;
  (b) a first computer database, accessible to the file server, containing pricing and product configuration data for a multitude of different products for sale;
  (c) a processor coupled to the file server and capable of:
    (1) searching the first computer database for those products of the multitude that match a request containing select product configuration data transmitted through the wide area network by one of the potential buyers, and (2) automatically transferring the pricing data and product configuration data of the matching products through the wide area network to the personal computer of the potential buyer who made the request;

(d) a second computer database coupled to the file server and capable of automatically recording buyer identification data, seller identification data, price, and product configuration data in response to purchase orders transmitted over the wide area network to the file server from the personal computer of a potential buyer; and (e) a third computer database coupled to the file server to which potential buyers can post special offers to purchase, for consideration by a particular, buyer-specified potential seller.

2. The system of claim 1 further comprising an automated billing system capable of automatically generating a bill for a fee for each purchase order transmitted over the wide area network to the file server from the personal computer of a potential buyer.

3. The system of claim 1 further comprising a seller identification database.

4. The system of claim 1 wherein the potential sellers can upload to the file server at will the pricing data and product configuration data for products being offered by the potential sellers.

5. The system of claim 1 wherein each potential seller can perform a mass upload to the file server of pricing data and product configuration data for all products of that potential seller.

6. The system of claim 1 wherein the processor is capable of ranking the matching products by price and automatically transferring the ranking through the wide area network to the personal computer of the potential buyer who made the request.

7. The system of claim 1 wherein the first computer database further contains geographic data for the sellers, and wherein the processor is capable of limiting matching products to those products in a geographic region specified by the potential buyer.

8. The system of claim 1 wherein the request can include a price cap, and wherein the processor is capable of limiting matching products to those products below the specified price cap.

9. The system of claim 1 wherein the processor is capable of identifying the lowest-priced matching product and automatically transferring the pricing and product configuration data for the lowest-priced matching product through the wide area network to the personal computer of the potential buyer who made the request.

10. The system of claim 1 further comprising a network link between the file server and financial institutions.

11. The system of claim 1 wherein the wide area network is the Internet.

12. The system of claim 1 wherein the product configuration data includes information concerning the products' brand, style, or make.

13. The system of claim 12 wherein the product configuration data also includes information concerning the products' color choices, options, or feature choices.

14. The system of claim 1 wherein the product configuration data also includes detailed descriptions of the products.

15. The system of claim 1 wherein the product configuration data includes information concerning the products' color choices, options, or feature choices.

16. The system of claim 1:
(a) wherein the wide area network is the Internet;
(b) wherein the processor is capable of ranking the matching products by price and automatically transferring the ranking through the wide area network to the personal computer of the potential buyer who made the request;
(c) wherein the potential sellers can upload to the file server at will the pricing data and product configuration data for products being offered by the potential sellers; and
(d) further comprising an automated billing system capable of automatically generating a bill for a fee for each purchase order transmitted over the wide area network to the file server from the personal computer of a potential buyer.

17. An electronic product exchange system comprising:
(a) a file server accessible through the Internet:
    (1) from personal computers of a multitude of potential buyers coupled to the network, and
    (2) by a multitude of potential sellers;
(b) a first computer database, accessible to the file server, containing pricing and product configuration data for a multitude of different products for sale;
(c) a processor coupled to the file server and capable of:
    (1) searching the first computer database for those products of the multitude that match a request containing select product configuration data transmitted through the Internet by one of the potential buyers, and
    (2) automatically transferring the pricing data and product configuration data of the matching products through the Internet to the personal computer of the potential buyer who made the request;
(d) a second computer database coupled to the file server to which potential buyers can post through the Internet special offers to purchase, for consideration by potential sellers; and
(e) a third computer database coupled to the file server and capable of automatically recording buyer identification data, seller identification data, price, and product configuration data in response to either of:
    (1) a purchase order transmitted through the Internet to the file server from the personal computer of a potential buyer, and
    (2) an acceptance of a special offer to purchase transmitted through the Internet to the file server from one of the potential sellers.

18. A method for implementing an electronic product exchange comprising:
(a) making accessible through a generally available wide area network a first computer database containing pricing data and product configuration data for a multitude of different products for sale by a multitude of potential sellers;
(b) making accessible through the network a processor capable of receiving a command from personal computers of a multitude of potential buyers coupled to the network, which processor is capable of:
    (1) searching the first computer database for those products of the multitude that match a request containing select product configuration data transmitted through the wide area network by one of the potential buyers, and
    (2) automatically transferring the pricing data and product configuration data of the matching products through the wide area network to the personal computer of the potential buyer who made the request; and (c) accepting through the network from any of the potential buyers a special offer to purchase, for consideration by a particular, buyer-specified potential seller; and (d) automatically recording in a second computer database buyer identification data, seller identification data, price, and product configuration data in response to product purchases agreed upon through the electronic product exchange.

19. The method of claim 18 further comprising configuring the first computer database so that each of the potential sellers can perform a mass upload at will of the pricing data and product configuration data for products being offered by each such potential seller.

20. The method of claim 18 further comprising coupling to the second computer database an automated billing system capable of automatically generating a bill for a fee for each purchase order transmitted over the network from the personal computer of a potential buyer.

21. The method of claim 18 wherein the wide area network is the Internet.

22. A method for operating an electronic product exchange comprising:
  (a) accepting, and storing in a single, first database, from each of a multitude of potential sellers, through a generally available wide area network, pricing data and product configuration data for a multitude of different products for sale by the multitude of potential sellers;
  (b) accepting through the generally available wide area network, from personal computers of each of a multitude of potential buyers, requests containing select product configuration data;
  (c) responsive to each of said requests, searching the first computer database for those products of the multitude that match the select product configuration data of the request and automatically transferring the pricing data and product configuration data of the matching products through the wide area network to the personal computer of the potential buyer who made the request;
  (d) accepting purchase orders over the wide area network from the personal computer of a potential buyer, and responsive thereto, automatically recording buyer identification data, seller identification data, price, and product configuration data in a second computer database; and
  (e) accepting from potential buyers special offers to purchase directed to a particular, buyer-specified potential seller and responsive thereto, automatically making available to the buyer-specific potential seller, but not other sellers, the offer to purchase.

23. The method of claim 22 further comprising automatically generating a bill for a fee for each purchase order for which information is recorded in the second database.

24. The method of claim 22 further comprising, for each potential seller, before part (a), collecting in a third database seller identification data.

25. The method of claim 22 further comprising automatically ranking the matching products by price and automatically transferring the ranking through the wide area network to the personal computer of the potential buyer who made the request.

26. The method of claim 22 wherein part (a) also includes accepting geographic data for each of the potential sellers, wherein part (b) also includes accepting specifications of one of several geographic regions, and wherein part (c) also includes limiting matching products to those products in the geographic region specified by the potential buyer.

27. The method of claim 22 wherein part (b) also includes accepting specification of a price cap, and wherein part (c) also includes limiting matching products to those products below the price cap specified by the potential buyer.

28. The method of claim 22 further comprising automatically identifying the lowest-priced matching product and automatically transferring the pricing and product configuration data for the lowest-priced matching product through the wide area network to the personal computer of the potential buyer who made the request.

29. The method of claim 22 wherein accepting product configuration data includes accepting information concerning the products' brand, style, or make.

30. The method of claim 22 wherein accepting product configuration data also includes accepting information concerning the products' color choices, options, or feature choices.

31. The method of claim 22 wherein accepting product configuration data also includes accepting detailed descriptions of the products.

32. The method of claim 22 further comprising:
  (a) automatically ranking the matching products by price and automatically transferring the ranking through the wide area network to the personal computer of the potential buyer who made the request;
  (b) posting at a third computer database accessible over the network by potential sellers, the special offers to purchase; and
  (c) automatically generating a bill for a fee for each purchase order for which information is recorded in the second database.

33. A method for operating an electronic product exchange comprising:
  (a) accepting, and storing in a single, first database, from each of a multitude of potential sellers, through the Internet, pricing data and product configuration data for a multitude of different products for sale by the multitude of potential sellers;
  (b) accepting through the Internet, from personal computers of each of a multitude of potential buyers, requests containing select product configuration data;
  (c) responsive to each of said requests, searching the first database for those products of the multitude that match the select product configuration data of the request and automatically transferring the pricing data and product configuration data of the matching products through the Internet to the personal computer of the potential buyer who made the request;
  (d) accepting from potential buyers through the Internet, and posting at a second computer database accessible over the network by potential sellers, special offers to purchase at a specified price;
  (e) accepting over the Internet:
    (1) purchase orders from the personal computers of at least one of the potential buyers, and
    (2) acceptances of selected of the posted special offers to purchase from at least one of the potential sellers; and
  (f) responsive to orders and acceptances in part (e), automatically recording buyer identification data, seller identification data, price, and product configuration data in a third computer database.

34. The method of claim 33 further comprising automatically generating a bill for a fee for each purchase order for which information is recorded in the third database.

35. The method of claim 33 further comprising automatically ranking the matching products by price and automatically transferring the ranking through the Internet to the personal computer of the potential buyer who made the request.

36. The method of claim 33 wherein accepting the pricing data and product configuration data comprises allowing the potential sellers to upload the data through the Internet to the computer storage at will.

37. An electronic product exchange system comprising:
  (a) a file server accessible through a generally available wide area network:
    (1) from personal computers of a multitude of potential buyers coupled to the network, and
    (2) by a multitude of potential sellers;
  (b) a first computer database, accessible to the file server, containing pricing and product configuration data for a multitude of different products for sale;
  (c) a processor coupled to the file server and capable of:
    (1) searching the first computer database for those products of the multitude that match a request, containing a price cap and select product configuration data, transmitted through the wide area network by one of the potential buyers, and
    (2) automatically transferring the pricing data and product configuration data of the products that match the product configuration data of the request and that are priced below the specified price cap, through the wide area network to the personal computer of the potential buyer who made the request; and
  (d) a second computer database coupled to the file server and capable of automatically recording buyer identification data, seller identification data, price, and product configuration data in response to purchase orders transmitted over the wide area network to the file server from the personal computer of a potential buyer.

38. The system of claim 37 further comprising a third computer database coupled to the file server to which potential buyers can post special offers to purchase, for consideration by potential sellers.

39. The system of claim 37 wherein each potential seller can perform a mass upload to the file server of pricing data and product configuration data for all products of that potential seller.

40. The system of claim 37 wherein the processor is capable of ranking the matching products by price and automatically transferring the ranking through the wide area network to the personal computer of the potential buyer who made the request.

41. The system of claim 37 wherein the processor is further capable of identifying the lowest-priced matching product and automatically transferring the pricing and product configuration data for the lowest-priced matching product through the wide area network to the personal computer of the potential buyer who made the request.

42. The system of claim 37 further comprising a network link between the file server and financial institutions.

43. The system of claim 37 wherein the product configuration data includes (a) information concerning the products' brand, style, or make, (b) information concerning the products' color choices, options, or feature choices, and (c) detailed descriptions of the products.

44. The system of claim 37:
  (a) wherein the wide area network is the Internet;
  (b) wherein the processor is capable of ranking the matching products by price and automatically transferring the ranking through the wide area network to the personal computer of the potential buyer who made the request;
  (c) wherein the potential sellers can upload to the file server at will the pricing data and product configuration data for products being offered by the potential sellers;
  (d) further comprising an automated billing system capable of automatically generating a bill for a fee for each purchase order transmitted over the wide area network to the file server from the personal computer of a potential buyer; and
  (e) further comprising a third computer database coupled to the file server to which potential buyers can post special offers to purchase, for consideration by potential sellers.

45. A method for implementing an electronic product exchange comprising:
  (a) making accessible through the Internet a first computer database containing pricing data and product configuration data for a multitude of different products for sale by a multitude of potential sellers;
  (b) making accessible through the Internet a processor capable of receiving a command from personal computers of a multitude of potential buyers coupled to the network, which processor is capable of:
    (1) searching the first computer database for those products of the multitude that match a request, containing a price cap and select product configuration data, transmitted through the wide area network by one of the potential buyers, and
    (2) automatically transferring the pricing data and product configuration data of the products that match the product configuration data of the request and that are priced below the specified price cap, through the wide area network to the personal computer of the potential buyer who made the request
  (c) making the first computer database accessible to a second computer database capable of automatically recording buyer identification data, seller identification data, price, and product configuration data in response to purchase orders transmitted over the Internet from the personal computer of a potential buyer.

46. The method of claim 45 further comprising:
  (a) configuring the first computer database so that each of the potential sellers can perform a mass upload at will of the pricing data and product configuration data for products being offered by each such potential seller;
  (b) coupling to the second computer database an automated billing system capable of automatically generating a bill for a fee for each purchase order transmitted over the network from the personal computer of a potential buyer.

47. A method for operating an electronic product exchange comprising:
  (a) accepting, and storing in a single, first database, from each of a multitude of potential sellers, through a generally available wide area network, pricing data and product configuration data for a multitude of different products for sale by the multitude of potential sellers;
  (b) accepting through the generally available wide area network, from personal computers of each of a multitude of potential buyers, requests containing a price cap and select product configuration data;
  (c) responsive to each of said requests, searching the first computer database for those products of the multitude that match the select product configuration data of the request and that have prices equal to or below the price cap in the request, and automatically transferring the pricing data and product configuration data of the matching products through the wide area network to the personal computer of the potential buyer who made the request; and (d) accepting purchase orders over the wide area network from the personal computer of a potential buyer, and responsive thereto, automatically recording buyer identification data, seller identification data, price, and product configuration data in a second computer database.

48. The method of claim 47 further comprising automatically generating a bill for a fee for each purchase order for which information is recorded in the second database.

49. The method of claim 47 further comprising automatically ranking the matching products by price and automatically transferring the ranking through the wide area network to the personal computer of the potential buyer who made the request.

50. The method of claim 47 wherein part (a) also includes accepting geographic data for each of the potential sellers, wherein part (b) also includes accepting specifications of one of several geographic regions, and wherein part (c) also includes limiting matching products to those products in the geographic region specified by the potential buyer.

* * * * *